United States Patent [19]

Madwed

[11] Patent Number: 4,645,411
[45] Date of Patent: Feb. 24, 1987

[54] GRIPPER ASSEMBLY

[76] Inventor: Albert Madwed, 110 Wedgewood Dr., Easton, Conn. 06612

[21] Appl. No.: 712,809

[22] Filed: Mar. 18, 1985

[51] Int. Cl.$^4$ ............................................. B65G 25/00
[52] U.S. Cl. .................... 414/753; 414/736; 414/739; 901/39; 294/106; 294/902; 198/468.2; 269/280
[58] Field of Search .................... 414/744 A, 730, 736, 414/753, 739, 751; 901/39, 31, 32, 30; 269/279, 280; 294/93-97, 106, 902; 198/468.2, 470.1, 803.11, 803.3, 473.1

[56] References Cited

U.S. PATENT DOCUMENTS

| | | | |
|---|---|---|---|
| 3,272,347 | 9/1966 | Lemelson | 901/32 X |
| 3,422,967 | 1/1969 | Aron | 414/753 |
| 4,211,123 | 7/1980 | Mack | 901/39 X |
| 4,545,723 | 10/1985 | Clark | 901/31 X |

FOREIGN PATENT DOCUMENTS 776914 11/1980 U.S.S.R. ............................. 901/39 X

OTHER PUBLICATIONS

IBM Tech. Disclosure Bulletin; vol. 20, No. 9; Feb. 1978; "Gripper", Ringer, Jr.

*Primary Examiner*—Joseph E. Valenza
*Attorney, Agent, or Firm*—Cohen, Pontani & Lieberman

[57] ABSTRACT

A gripper assembly for incorporation in a programmable machine comprises a gripper having a peripheral portion defining a plurality of different shaped object-receiving recesses therein, a member for supporting the gripper, an arrangement for securing the gripper to the supporting member for rotation relative thereto, and apparatus responsive to an electrical signal for rotating the gripper relative to the supporting member. A programmable machine incorporating two such gripper assemblies is also disclosed.

9 Claims, 11 Drawing Figures

GRIPPER ASSEMBLY

TECHNICAL FIELD

This invention relates to programmable machines such as robots or manipulators, and particularly to end effectors usable with such programmable machines. Most particularly, this invention relates to a special type of end effector known as a gripper which is used to hold a part for manipulation by the machine.

BACKGROUND ART

It is widely expected that in the future many manufactured products will be completely or partially manufactured by robots and other programmable machines. The part of the robot or programmable machine that actually contacts the part to be manipulated is referred to as an end effector. An end effector is typically used for one of two basic operations: gripping and manipulating a workpiece or performing a manufacturing operation such as welding or painting. The present invention is concerned with the first category of end effector, known as a gripper.

A potential major application of robots and programmable machines generally is in automated assembly requiring gripping and manipulation of an assembly part. Although sophisticated programmable machines are available to perform the required complex manipulations, known gripper designs are typically limited in their ability to handle different shaped parts encountered in an assembly operation, and most grippers are designed to handle only a single part or a family of similarly shaped parts.

One solution to this problem is to provide individual grippers arranged in racks within reach of the robot arm, with the machine being programmed to manipulate the arm to change one gripper for another as desired. However, this increases the time required for an assembly operation, and hence necessarily increases the cost of assembly as well.

A better solution in terms of time and cost factors is a universal gripper capable of manipulating and gripping different shaped parts. While there have been attempts to design a universal gripper to operate in the manner of a human hand, as of yet such designs have not proved successful. Moreover, the requirement that such a gripper have variable gripping forces will necessarily complicate its use.

It is therefore desirable to provide a gripper assembly incorporating a gripper capable of manipulating different shaped parts, and to provide a programmable machine incorporating such a gripper assembly, with the machine being preprogrammed to manipulate the gripper assembly as required to grasp and release the different shaped parts.

DISCLOSURE OF THE INVENTION

The present invention comprises a gripper assembly, a gripper for incorporation in the gripper assembly, and a programmable machine incorporating two gripper assemblies for gripping a plurality of different shaped objects.

In accordance with the invention, each gripper assembly comprises a support member, a gripper secured to the support member for rotation relative thereto, and means responsive to an electrical signal for rotating the gripper relative to its support member. The gripper includes a peripheral portion having a plurality of different shaped object-receiving recess therein, the correct shapes being selected by appropriate rotation of the gripper relative to the support member. The programmable machine of the invention includes two gripper assemblies, and further comprises means for moving the gripper assemblies relative to each other, and control means operatively connected to the gripper rotating means and to the gripper assembly moving means for rotating the grippers relative to their respective support members and for moving the gripper assemblies relative to each other in a preprogrammed sequence.

Typically, after the grippers have grasped and released one object, and while they are being moved to the next, different shaped object, the control means rotates the grippers to select the appropriate object-receiving recesses for grasping the second object. Therefore, when the gripper actually reaches the object, it is only necessary to move the gripper assemblies together for grasping the object between the grippers. Owing to this ability, and the fact that grippers do not have to be interchanged each time it is desired to grasp a different shaped object, it will be apparent that an automated assembly incorporating the present invention is highly cost effective and efficient. While the gripper of the present invention is not a universal gripper in the sense that it is capable of grasping any shaped object, it is superior to known grippers in that it can grasp a wide variety of different shapes, limited only by the number of object-receiving recesses, which can be accommodated on the periphery of the gripper.

In one preferred embodiment of the invention, the grippers are disk-shaped, with the object-receiving recesses distributed about the periphery of the disks. In another embodiment, the grippers are cylindrically shaped with the object-receiving recesses distributed over the cylinder walls. The advantage of this latter embodiment is that it accommodates a larger number of object-receiving recesses. In another embodiment the grippers are in the shape of spheres with recesses distributed over the outer surface thereof. If desired, each recess can have its own design for adjusting the gripping force for particular applications. For example, springs or rubber linings may be provided in selected recesses.

Further features and advantages of the invention will be more fully apparent from the following detailed description and annexed drawings, wherein like numerals represent like parts.

BEST MODE FOR CARRYING OUT THE INVENTION

Figures 1, 6, 7, 8:
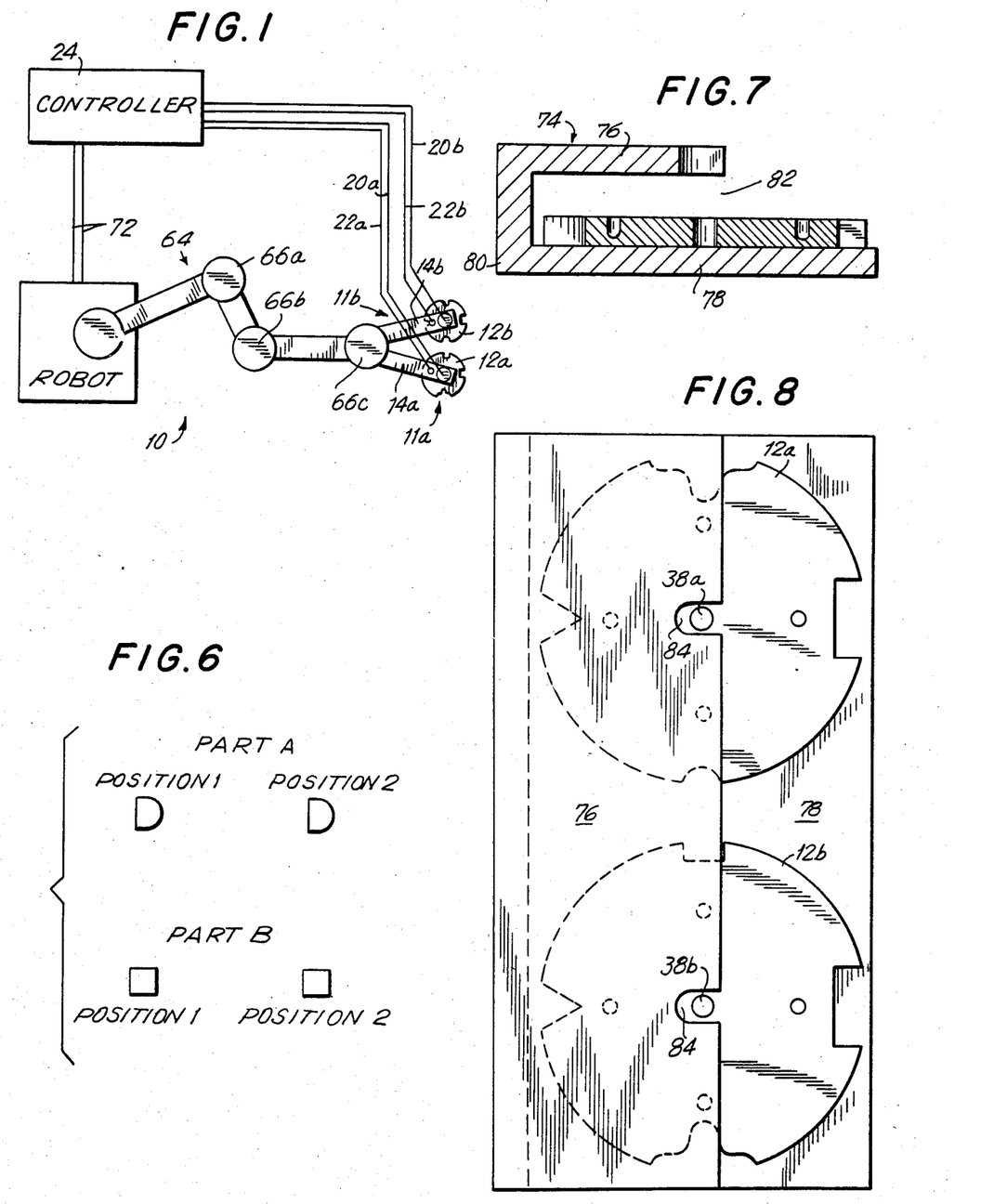
FIG. 1 is a diagrammatic representation of a robot incorporating the present invention.
FIG. 6 diagrammatically illustrates a sequence of operations which can be efficiently executed by the robot of the invention.
FIG. 7 is a side elevation of a structure for stripping the grippers from their respective support members.
FIG. 8 is a top plan of the structure of FIG. 7.
Figure 2:
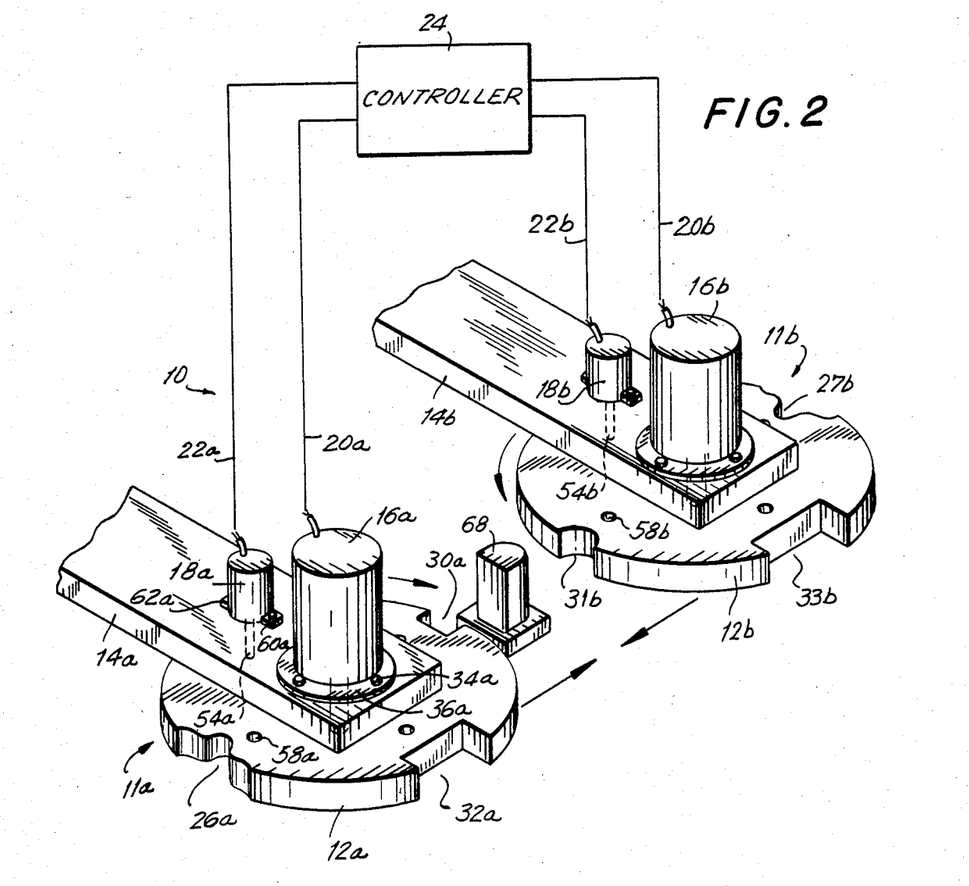
FIG. 2 is a partially perspective, partially diagrammatic illustration of a portion of the robot of FIG. 1 showing the gripper assemblies in greater detail.

Referring now to the drawings, and initially to FIGS. 1 and 2 thereof, a preferred programmable machine in the form of a robot in accordance with the present invention is generally designated by the reference numeral 10. As best illutrated in FIG. 1, the programmable machine 10 comprises a pair of gripper assemblies 11a, 11b, each including a gripper 12a, 12b, rotatably secured to a support member or arm 14a, 14b. Secured to each support arm 14a, 14b is a rotating means, preferably comprising an indexing or stepping motor 16a, 16b, for rotating the grippers 12a, 12b relative to their respective support arms 14a and 14b. Also secured to each support arm 14a, 14b is releasable locking mechanism 18a, 18b for releasably securing the grippers 12a, 12b against rotation relative to the support arms 14a, 14b. As diagrammatically illustrated in FIG. 2, the stepping motors 16a, 16b and locking mechanisms 18a, 18b are connected, as by wires 20a, 20b and 22a, 22b, respectively, to a control means 24, which may comprise a microprocessor, for controlling operation of the stepping motors 16a, 16b and locking mechanisms 18a, 18b according to a predetermined sequence, as will be more fully explained hereinafter.

Referring to FIGS. 1-5, each gripper 12a, 12b is substantially disk-shaped and has a plurality of different shaped object-receiving recesses in the periphery thereof. In the embodiment of FIGS. 1-5, the gripper 12a has four different shaped object-receiving recesses 26a, 28a, 30a and 32a in the periphery thereof. The gripper 12b likewise has four object-receiving recesses 27b, 29b, 31b and 33b some, but not all of which, are the same as the recesses in the gripper 12a. It should be understood, however, that the provision of identical recesses in the two grippers 12a and 12b is not mandatory, and for specific applications there may be no such identical recesses.

The gripping assemblies 11a, 11b will now be described in greater detail. For ease of reference, only the gripper assembly 11a will be described, it being understood that the description applies equally to the gripper assembly 11b.

Figure 4:
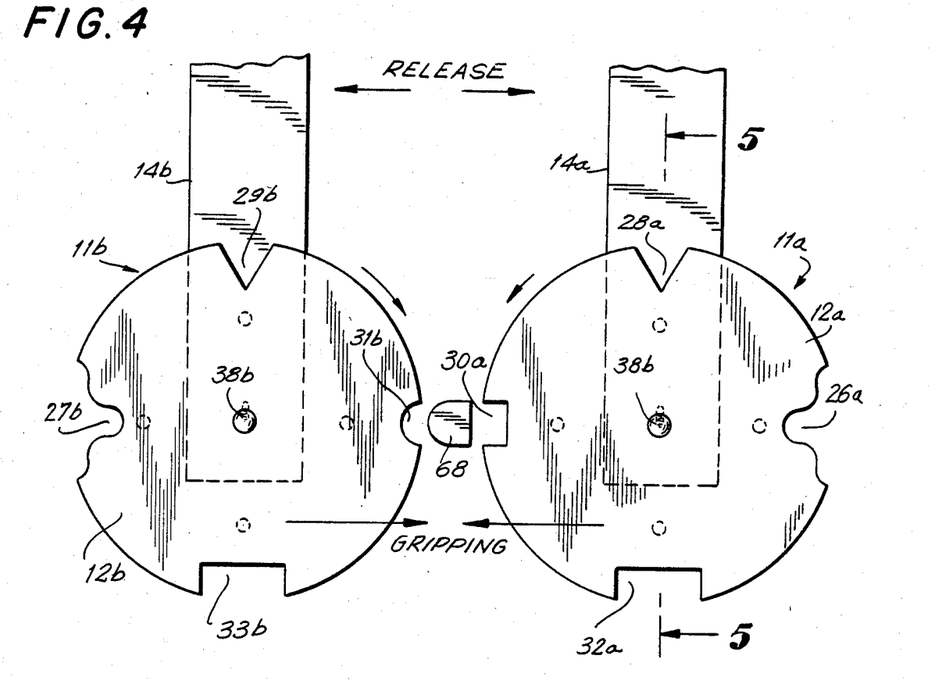
FIG. 4 is a bottom plan view of the gripper assemblies illustrated in FIG. 2.
Figure 5:
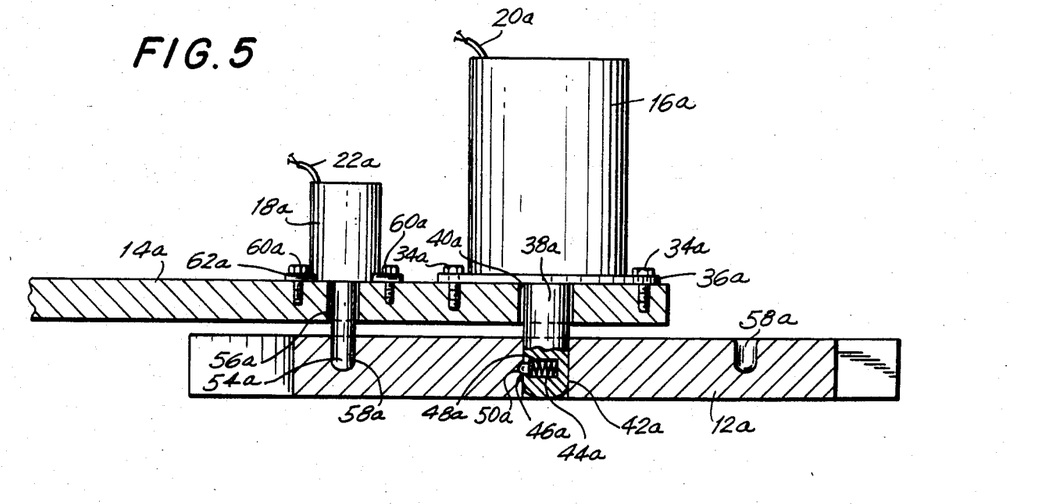
FIG. 5 is a partly sectional side elevation of the left hand gripper assembly in FIG. 2.

As best shown in FIGS. 2 and 5, the stepping motor 16a of the gripper assembly 11a is secured atop the support arm 14a as by a plurality of bolts 34a extending through an annular flange 36a at the lower end of the motor housing. Referring to FIGS. 4 and 5, the shaft 38a of the motor 16a extends through an aligned centered hole 42a in the disk-shaped gripper 12a, the latter being positioned on the bottom of the support arm 14a. The portion of the shaft 38a extending through the hole 42a in the gripper 12a is provided with a radially extending bore 44a for receiving a detent 46a biased to a radially outward position by a spring 48a. A radially extending recess 50a is provided in the wall defining the hole 42a for receiving the detent 46a for releasably securing the gripper 12a to the motor shaft 38a in a well known manner.

The locking mechanism 18a may comprise an electromagnet having an armature 54a extending through a hole 56a in the support arm 14a and receivable in one of a plurality of alignable blind holes 58a provided in the confronting face of the gripper 12a. It will be apparent that when the armature 54a is received in one of the holes 58a the gripper 12a is locked against rotation relative to the support arm 14a. Like motor 16a, locking machanism 18a may be secured to support arm 14a by a plurality of bolts 60 extending through a flange 62a formed at the lower end of the housing for the locking mechanism.

Referring again to FIG. 1, the robot 10 includes the usual arm 64 having a plurality of joints 66 for positioning the gripping assemblies 11a, 11b at any given locus of x, y, z points within the range of the arm 64. As shown, the rear ends of the support arms 14a, 14b are secured to the joint 66c which incorporates a mechanism for moving the support arms 14a, 14b towards and away from each other for adjusting the spacing between the grippers 12a and 12b. As the details of construction of the arm 64 and joints 66a, 66b and 66c for accomplishing the aforementioned objectives are well within the capabilities of the person of ordinary skill, a further description thereof is deemed unnecessary.

The operation of the robot 10 will now be explained by describing the sequence of steps for moving the part 68 shown in FIG. 2 from a first position to a second position and for then moving the part 70 shown in FIG. 3 from a first position to a second position, this sequence being diagrammatically illustrated in FIG. 6. Referring to FIGS. 1, 2 and 5, the control means 24, which has been preprogrammed to carry out the sequence of steps described hereinbelow, first provides an electrical signal via wires 22a, 22b to the locking mechanisms 18a, 18b for retracting the armatures 54a, 54b from their respective holes 58a, 58b thereby freeing the grippers 12a, 12b for rotation relative to their respective support arms 14a, 14b. With the armatures 54a, 54b in their retracted positions, the control means 24 next provides signals to the stepping motors 16a, 16b via the wires 20a, 20b for rotating the shafts 38a, 38b and their respective attached grippers 12a, 12b until the square-shaped recess 30a in the periphery of the gripper 12a is confronting the semicircular recess 31b in the periphery of the gripper 12b. The control means 24 then discontinues rotation of the stepping motors 16a and 16b and provides a signal to the locking mechanisms 18a and 18b for moving the armatures 54a, 54b into their respective aligned holes 58a, 58b for securing the grippers 12a, 12b against rotation relative to the support arms 14a, 14b. It will be appreciated that there is one armature-receiving hole 58a, 58b for each of the peripheral recesses in the grippers 12a, 12b, respectively, such that one of the holes will be aligned with its respective armature 54a, 54b whenever one of the peripheral recesses is in its operative position.

The control means 24 next provides a signal via wires 72 to the robot arm 64 for moving the support arms 14a, 14b together for grasping the object 68 between the grippers 12a and 12b. The control means 24 then provides a signal via wires 72 to move the robot arm 64 for transferring the object 68 from the first position to the second position (FIG. 6). Once the object 68 is in the second position, the control means provides a signal via wires 72 to the robot arm 64 for separating the support arms 14a and 14b thereby releasing the object 68.

Figure 3:
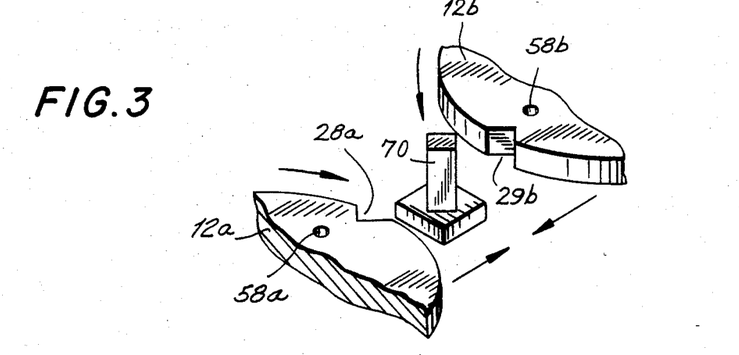
FIG. 3 is a fragmentary perspective view of a portion of the gripper assemblies shown in FIG. 2.

Referring now to FIG. 3, the robot 10 is now ready to transfer the second object 70 from a first position to a second position. If the robot 10 employed a gripper adapted for manipulating an object having only a specific shape, it would be necessary at this point to change the grippers thereby adding an additional sequence of steps to the operation. This is, of course, time consuming, and reduces the overall efficiency of the automated process. This is avoided in accordance with the present invention.

The control means 24 now provides a signal to the robot arm 64 via wires 72 for moving the grippers 12a and 12b into confronting relation on either side of the object 70. At the same time, that is while the robot arm 64 is being moved to the object 70, a signal is provided from the control means 24 to the locking mechanisms 18a and 18b via wires 22a, 22b, respectively, to retract the armatures 54a, 54b from their respective holes 58a, 58b in the grippers 12a, 12b, thereby again freeing the grippers 12a, 12b for rotation relative to the support arms 14a, 14b. Following retraction of the armatures 54a, 54b, the control means 24 signals the stepping motors 16a and 16b via wires 20a, 20b, for rotating the grippers 12a, 12b until the recesses 28a and 29b corresponding to the shape of the object 70 are in confronting relation. See FIG. 3. The control means 24 next provides signals to the locking mechanisms 18a and 18b via wires 22a, 22b for reinserting the armatures 54a, 54b into the respective aligned holes 58a, 58b thereby again locking the grippers 12a, 12b against rotation relative to the support arms 14a, 14b.

Consequently, by the time the robot arm 64 has been moved to a position wherein the grippers 12a, 12b are ready to grasp the object 70, the appropriate recesses 28a and 29b are already in position. No interchange of grippers is necessary, and the time required for the operation has been reduced.

The control means 24 next provides a signal via wires 72 for moving the support arms 14a, 14b together until the grippers 12a, 12b grasp the object 70, whereupon the control means 24 moves the robot arm 64 for transferring the object 70 to its second position, thereby completing the desired operation. At this point, the sequence can be repeated, as will often be the case on an automated assembly line, or a new sequence may be carried out for performing a different operation by appropriately programming the control means 24.

It will be appreciated that while the disk-shaped grippers 12a and 12b may be provided with a number of different shaped recesses about their peripheries, which may be more than the four recesses illustrated in the drawings, it may be desirable for certain applications to substitute different disk shaped grippers having different shaped peripheral recesses to futher expand the range of operations performable by the robot 10. For such applications, disk substitution may be automated, i.e., accomplished without human intervention, and the robot 10 described above is designed to accommodate such automated substitution.

Referring to FIGS. 7 and 8, when it is desired to remove the grippers 12a and 12b from the arms 14a and 14b respectively, a gripper stripping and storage device 74 may be employed. As shown, the device 74 comprises a housing having a top wall 76, a bottom wall 78 and a back wall 80, the front being open at 82 for accommodating insertion of the grippers 12a, 12b. When it is desired to remove the grippers 12a, 12b, the control means 24 provides a signal via wires 72 for moving the robot arm 64 to insert the forward portions of the grippers 12a, 12b into the open end 82 in the manner best illustrated in FIG. 8. In this position the top wall 76 extends between the grippers 12a, 12b and their respective support arms 14a, 14b, with the shafts 38a, 38b being received in recesses 84 in the top wall. The control means 24 then provides a signal via wires 72 to the robot arm 64 for moving the robot arm vertically upward thereby stripping the grippers 12a, 12b from their respective detents 46a, 46b as the grippers strike the top wall 76. Once stripping is completed, control means 24 moves the robot arm 64 to position the shafts 38a, 38b above the openings 42a, 42b in a second pair of grippers 12a, 12b (not shown). To this end, the device 74 may be sufficiently long to store several sets of grippers at one time. The control means 24 then moves the arm 64 downward until the detents 46a, 46b lock in the recesses 50a, 50b in the new pair of grippers 12a, 12b. The control means 24 then manipulates the arm 64 for removing the support arms 14a, 14b and the newly attached grippers 12a, 12b from the device 74 for performing such further operations as may be programmed. Of course, if desired, one rather than both of the grippers 12a, 12b may be stripped from its respective support arm by manipulating the other support arm away from the device 74 during the stripping operation.

Figure 9:
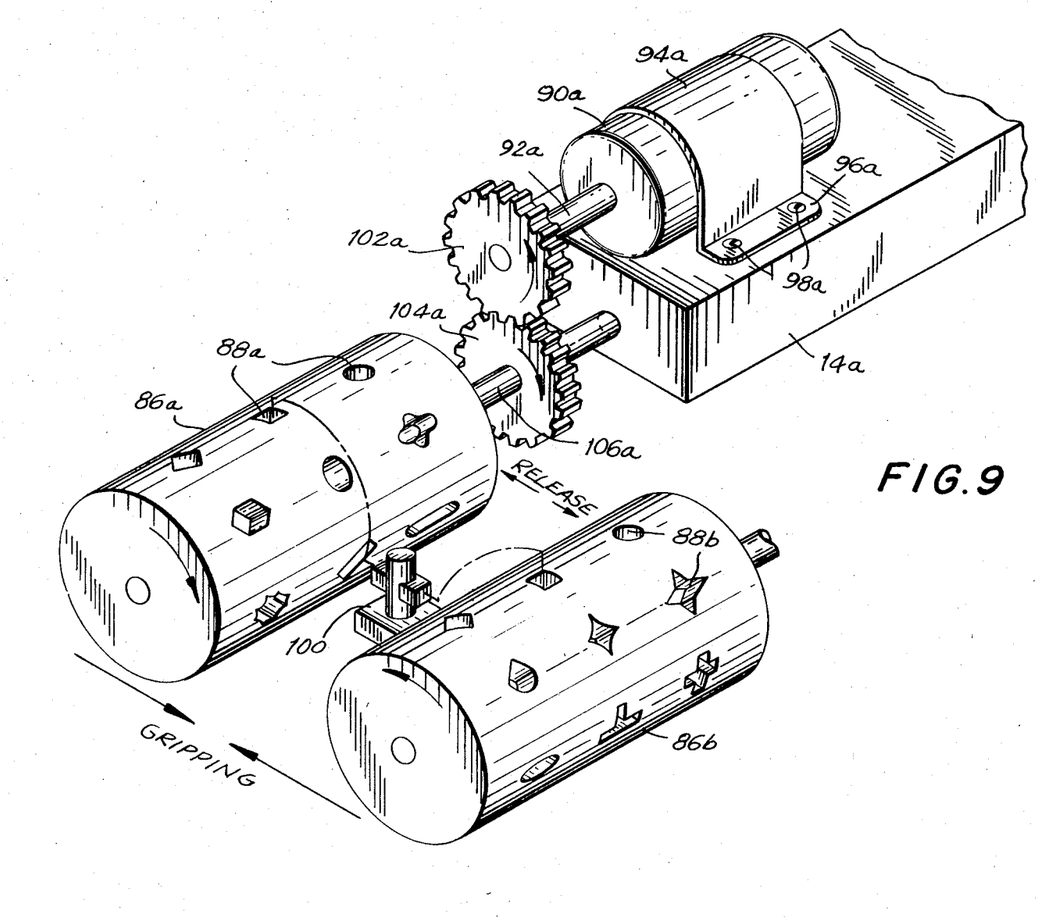
FIG. 9 is a perspective view illustrating an alternative embodiment of a gripper in accordance with the present invention.

Referring now to FIG. 9, an alternative embodiment of a gripper assembly in accordance with the present invention is illustrated. In the embodiment of FIG. 9, cylindrical grippers 86a, 86b having a plurality of different shaped recesses 88a, 88b distributed about their peripheries are substituted for the disk-shaped grippers 12a, 12b of FIGS. 1-8. It will be apparent from FIG. 9 that one of the advantages of this embodiment is the ability to accommodate a greater number of different shaped object-receiving recesses 88a, 88b on each gripper. For example, in the FIG. 9 embodiment, three axially spaced circumferential portions of the cylindrical grippers 86a, 86b are provided with object-receiving recesses 88a, 88b, respectively.

To rotate the grippers, the usual indexing or stepping motors are provided, only the stepping motor 90a being illustrated in FIG. 9. Unlike the embodiment of FIGS. 1-8, however, the stepping motor 90a is positioned with its shaft 92a coaxial with the axis of the cylindrical gripper 86a. The motor 90a may be secured to the support arm 14a by, for example, a U-shaped bracket 94a having flanged feet 96a for receiving bolts 98a. To avoid interference between the support arm 14a and the surface upon which the object 100 to be grasped is positioned, the gripper 86a is preferably coaxial with the support arm 14a. As shown in FIG. 9, this may be accomplished, for example, by a pair of gears 102a, 104a, the latter being secured to gripper 86a by a shaft 106a secured at one end to the gripper 86a and journaled at the other end in the end face of the support arm 14a. It will be appreciated that the driving mechanism for the gripper 86b is preferably the same as that just described for the gripper 86a.

To position the appropriate recesses 88a, 88b in confronting relation on either side of the object 100, it is necessary both to rotate the grippers 86a, 86b until the appropriate recesses 88a, 88b are in confronting relation, and to move the grippers axially to align the desired surface portions of the grippers with the object. This latter axial movement of the grippers 86a, 86b is readily accomplished simply by moving the support arms 14a, 14b forward and back, means for accomplishing such movement being well known to those of ordinary skill in the art.

It will be appreciated that the gripper assembly illustrated in FIG. 9 has all of the advantages of the gripper assembly of FIGS. 1-8. By distributing a large number of different shaped recesses 88a, 88b about the periphery of the grippers 86a, 86b, the grippers are capable of grasping a number of different shaped objects. By thus avoiding the requirement of changing the grippers for each different shaped object, the time required for a given sequence of operations is reduced, as is more fully explained above with respect to the embodiment of FIGS. 1-8. Indeed, and as noted above, the grippers 86a, 86b of FIG. 9 are capable of accommodating even a greater number of recesses 88a, 88b than the embodiment illustrated in FIGS. 1-8. Like the embodiment of FIGS. 1-8, the cylindrical grippers 86a, 86b may be strippable from their respective shafts 106a, 106b whereby new cylindrical grippers having yet additional shaped recesses may be substituted.

Figure 10:
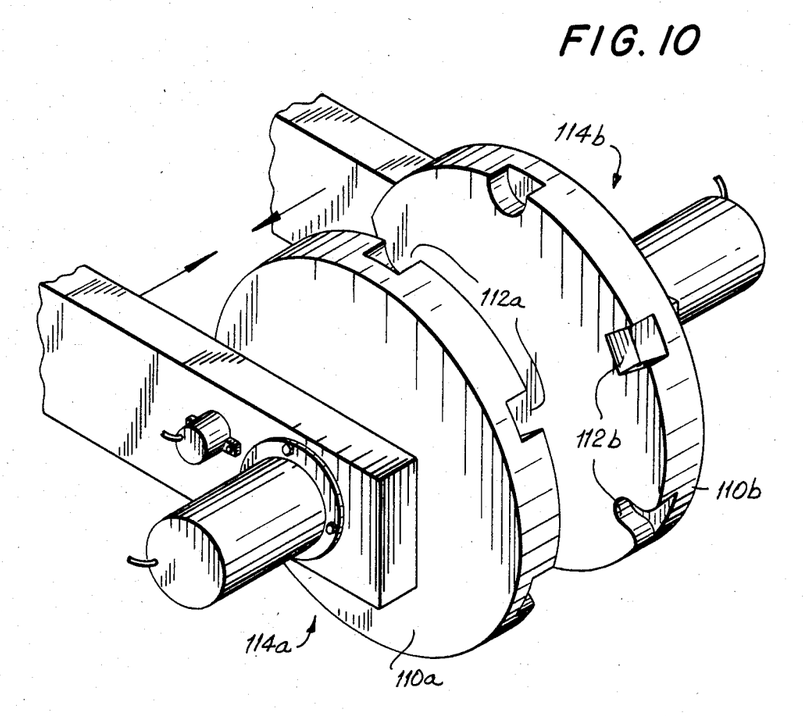
FIG. 10 is a perspective view of yet a further alternative gripper.

FIG. 10 shows another alternative gripper design in accordance with the present invention. The embodiment of FIG. 10 is similar to that of FIGS. 1-8, except that the gripper disks 110a and 110b are vertically rather than horizontally oriented, and the recesses 112a and 112b are cut into the confronting edges of the disks. Apart from this difference, the construction and operation of the gripper assemblies 114a and 114b of FIG. 10 are the same as for the gripper assemblies 11a and 11b of the embodiment of FIGS. 1-8. The embodiment of FIG. 10 would be employed, for example, where horizontal space limitations are encountered.

Figure 11:
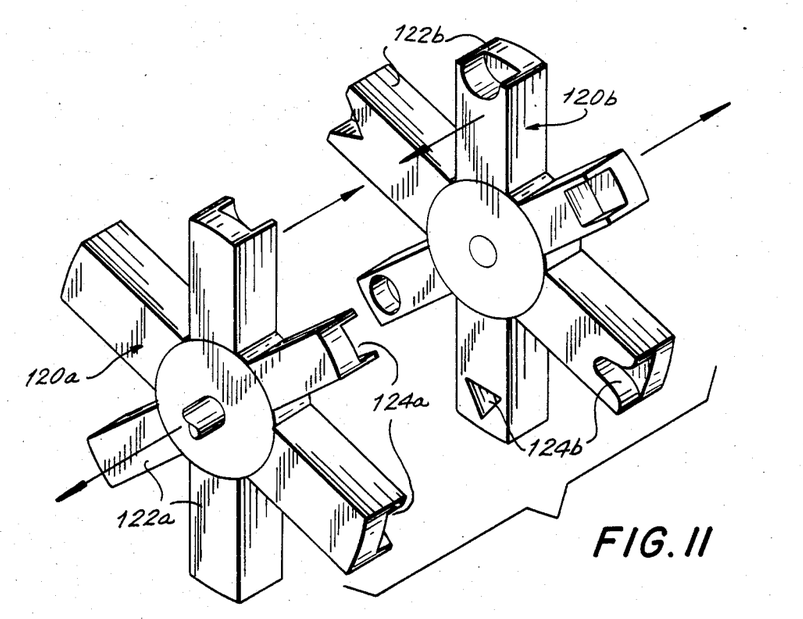
FIG. 11 is a perspective view of still another gripper embodiment.

For smaller space requirements, the grippers may comprise less than the full disks or cylinders described above. One such alternative arrangement is illustrated in FIG. 11 wherein each gripper 120a and 120b has the appearance of a rimless wheel with spokes 122a and 122b extending radially from the hub thereof, each spoke having a recess 124a, 124b in the free end thereof. Additional possibilities will be apparent to those of ordinary skill in the art.

Still additional shapes are possible. By way of example, a spherical shape with recesses distributed over the outer surface of the sphere may be employed. Again, appropriate means for securing such spherical grippers to the support arms and for rotating the spherical grippers relative thereto will be apparent to those of ordinary skill in the art.

While I have herein shown and described preferred embodiments of the present invention and have suggested certain modifications thereto, it will be apparent to those of ordinary skill in the art that still further changes and modifications may be made therein without departing from the spirit and scope of the invention. Accordingly, the above description should be construed as illustrative, and not in a limiting sense, the scope of the invention being defined by the following claims.

I claim:

1. In a gripper assembly for incorporation in a programmable machine and including a gripper and a coacting gripper surface movable relative to each other by moving means into operative relation for gripping therebetween a selected one of a plurality of different shaped objects, the improvement comprising:

said gripper having a peripheral portion defining thereabout a plurality of different shaped object-receiving recesses in said peripheral portion;

means for supporting said gripper;

means for securing said gripper to said supporting means for relative rotation of said gripper between a plurality of positions corresponding to predetermined relative rotations of said gripper for relatively rotatively moving a selected one of said plural recesses into a selected one of said plural positions for receiving in said selected recess at least a portion of an object substantially corresponding in shape to the shape of said selected recess; and means responsive to an electrical signal for predeterminately rotating said gripper relative to said supporting means to selectively move one of said recesses to a selected one of said plural positions.

2. The gripper assembly according to claim 1, wherein said gripper comprises a disk, and wherein said object-receiving recesses are distributed about the edge of the disk.

3. The gripper assembly according to claim 1, wherein said gripper comprises a cylinder, and wherein said object-receiving recesses are distributed over the outer cylindrical surface thereof.

4. The gripper assembly according to claim 1, wherein said gripper comprises a hub having a plurality of spoke-like members extending radially therefrom, and wherein said object-receiving recesses are in the free ends of said spoke-like members.

5. The gripper assembly according to claim 1, wherein said gripper comprises a disk, and wherein said object-receiving recesses are in one end face of said disk near the periphery thereof.

6. The gripper assembly according to claim 1, wherein said means for securing said gripper to said supporting means comprises a shaft; and wherein said means for rotating said gripper relative to said supporting means comprises a motor for rotating said shaft.

7. The gripper assembly according to claim 6, further comprising means for releasably locking said gripper against rotation relative to said shaft.

8. The gripper assembly according to claim 6, further comprising means for releasably securing said gripper to said shaft.

9. A programmable machine comprising:

a first gripper assembly comprising a first gripper having a peripheral portion defining thereabout a plurality of different shaped object-receiving recesses in said peripheral portion, first means for supporting said first gripper, first means for securing said first gripper to said first supporting means for relative rotation of said first gripper between a first plurality of positions corresponding to predetermined relative rotations of said first gripper for relatively rotatively moving a selected one of said plural recesses into a selected one of said first plural positions for receiving in said selected recess at least a portion of an object substantially corresponding in shape to the shape of said selected recess, and first means responsive to an electrical signal for predeterminately rotating said first gripper relative to said first supporting means to selectively move one of said first gripper recesses to a selected one of said first plural positions;

a second gripper assembly comprising a second gripper having a peripheral portion defining thereabout a plurality of objective-receiving recesses in said peripheral portion of said second gripper, second means for supporting said second gripper, second means for securing said second gripper to said second supporting means for relative rotation of said second gripper between a second plurality of positions corresponding to predetermined relative rotations of said second gripper for relatively rotatively moving a selected one of said second gripper plural recesses into a selected one of said plural positions thereof for receiving in said selected second gripper recess at least a portion of an object substantially corresponding in shape to the shape of said selected second gripper recess, and second means responsive to an electrical signal for predeterminately rotating said second gripper relative to said second supporting means to selectively move one of said second gripper recesses to a selected one of said second plural positions;

third means responsive to an electrical signal for moving said first and second supporting means relative to each other; and control means operatively connected to said first, second and third electrical signal responsive means for predeterminately rotating said grippers relative to their respective supporting means in a preprogrammed sequence, and for moving said supporting means relative to each other in a preprogrammed sequence for manipulating said first and second grippers for grasping an object between said selected first and second gripper object-receiving recesses thereof.

* * * * *